(12) United States Patent
Tsujibayashi (10) Patent No.: US 11,958,316 B2
(45) Date of Patent: Apr. 16, 2024

(54) TIRE

(71) Applicant: Sumitomo Rubber Industries, Ltd., Kobe (JP)

(72) Inventor: Satoko Tsujibayashi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/970,647

(22) Filed: Oct. 21, 2022

(65) Prior Publication Data

US 2023/0150312 A1 May 18, 2023

(30) Foreign Application Priority Data

Nov. 12, 2021 (JP) ................. 2021-185087

(51) Int. Cl.
*B60C 11/03* (2006.01)
*B60C 11/13* (2006.01)

(52) U.S. Cl.
CPC .......... *B60C 11/03* (2013.01); *B60C 11/1369* (2013.01); *B60C 2011/0346* (2013.01); *B60C 2011/0353* (2013.01); *B60C 2011/0355* (2013.01); *B60C 2011/1361* (2013.01)

(58) Field of Classification Search
CPC ..... B60C 2011/1361; B60C 2011/0346; B60C 11/1369; B60C 11/047; B60C 11/042; B60C 11/13; B60C 11/1353
See application file for complete search history.

(56) References Cited

U.S. PATENT DOCUMENTS 3,727,661 A * 4/1973 Hoke ................ B60C 11/032
152/209.22
2017/0008349 A1 * 1/2017 Tanaka ................ B60C 11/047
2019/0184762 A1 6/2019 Wada

FOREIGN PATENT DOCUMENTS

EP 2949482 A1 * 12/2015 ............. B60C 11/11
JP 2019-107941 A 7/2019

* cited by examiner

*Primary Examiner* — Justin R Fischer
*Assistant Examiner* — Wendy L Boss
(74) *Attorney, Agent, or Firm* — Birch, Stewart, Kolasch & Birch, LLP (57) ABSTRACT

A tire includes a tread portion being provided with circumferential grooves extending continuously in a zigzag manner. One of the circumferential grooves includes first inclined elements inclined in a first direction with respect to the tire circumferential direction, second inclined elements inclined in a second direction opposite to the first direction with respect to the tire circumferential direction, and intersections where the first inclined elements and second inclined elements intersect. Each of the first inclined elements and the second inclined elements is provided with at least one first protrusion that projects outwardly in a tire radial direction from the groove bottom and connects the pair of groove walls. At least one of the intersections is provided with a second protrusion that projects outwardly in the tire radial direction from the groove bottom and is separated from the pair of groove walls.

17 Claims, 7 Drawing Sheets

TIRE

RELATED APPLICATIONS

This application claims the benefit of foreign priority to Japanese Patent Application No. JP2021-185087, filed Nov. 12, 2021, which is incorporated by reference in its entirety.

FIELD OF THE DISCLOSURE

The present disclosure relates to a tire including a tread portion with a ground contact surface.

BACKGROUND OF THE DISCLOSURE

Conventionally, as tires suitable for traveling on rough terrain, a tire including a tread portion which is provided with a plurality of circumferential grooves extending in a zigzag manner in the tire circumferential direction has been known. For example, Patent Document 1 below proposes a tire including a main groove extending in a zigzag manner in the tire circumferential direction and protrusions extending in the groove width direction formed on the groove bottom of the main groove, in order to improve stone biting resistance.

Patent Document

[Patent document 1] Japanese Unexamined Patent Application Publication 2019-107941

SUMMARY OF THE DISCLOSURE

Unfortunately, stone biting may occur even in the main groove of Patent Document 1, and further improvement in stone biting resistance has been required.

The present disclosure has been made in view of the above circumstances and has a major object to provide a tire capable of improving stone biting resistance.

In one aspect of the present disclosure, a tire includes a tread portion having a ground contact surface, the tread portion being provided with a plurality of circumferential grooves extending continuously in a zigzag manner in a tire circumferential direction, each of the plurality of circumferential grooves including a groove bottom and a pair of groove walls extending from the groove bottom toward the ground contact surface, at least one of the plurality of circumferential grooves including first inclined elements inclined in a first direction with respect to the tire circumferential direction, second inclined elements inclined in a second direction opposite to the first direction with respect to the tire circumferential direction, and intersections where the first inclined elements and second inclined elements intersect. Each of the first inclined elements and the second inclined elements is provided with at least one first protrusion that projects outwardly in a tire radial direction from the groove bottom and connects the pair of groove walls. At least one of the intersections is provided with a second protrusion that projects outwardly in the tire radial direction from the groove bottom and is separated from the pair of groove walls.

DETAILED DESCRIPTION OF THE DISCLOSURE

Hereinafter, one or more embodiments of the present disclosure will be described in detail with reference to the drawings.

Figure 1:
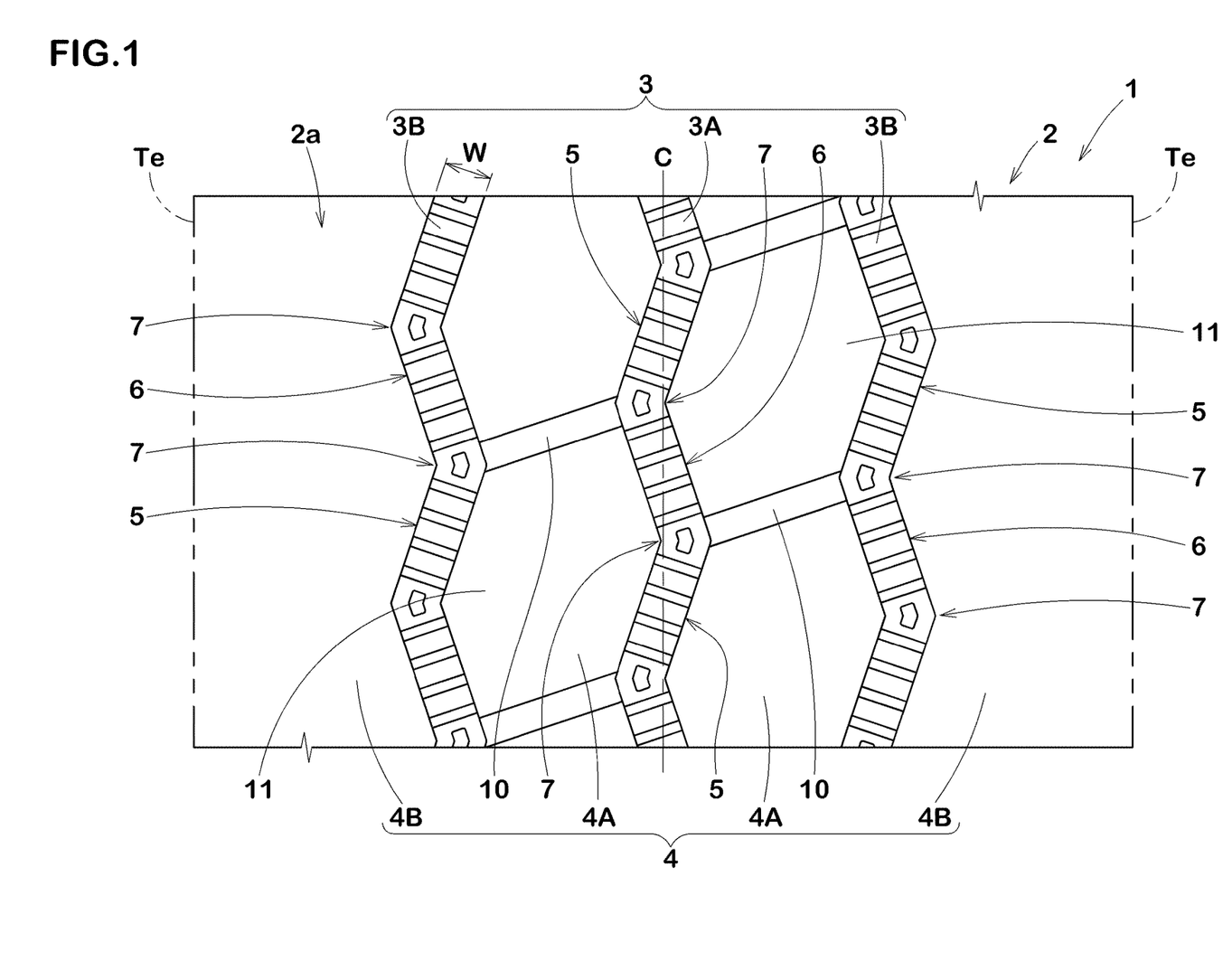
FIG. 1 is a development view showing an embodiment of a tread portion of a tire according to the present disclosure.

FIG. 1 is a development view showing an embodiment of a tread portion 2 of a tire 1. As illustrated in FIG. 1, the tire 1 according to the present embodiment includes the tread portion 2 having a ground contact surface 2*a*. In the present embodiment, the tread portion 2 is provided with a plurality of circumferential grooves 3 extending continuously in a zigzag manner in the tire circumferential direction, and a plurality of land portions 4 demarcated by the circumferential grooves 3.

In FIG. 1, four land portions 4 demarcated by three circumferential groove 3 are shown. However, the number of circumferential grooves 3 is not limited to such an aspect, but two or four circumferential grooves 3 may be provided. Note that the number of land portions 4 is determined by the number of circumferential grooves 3.

Figure 2:
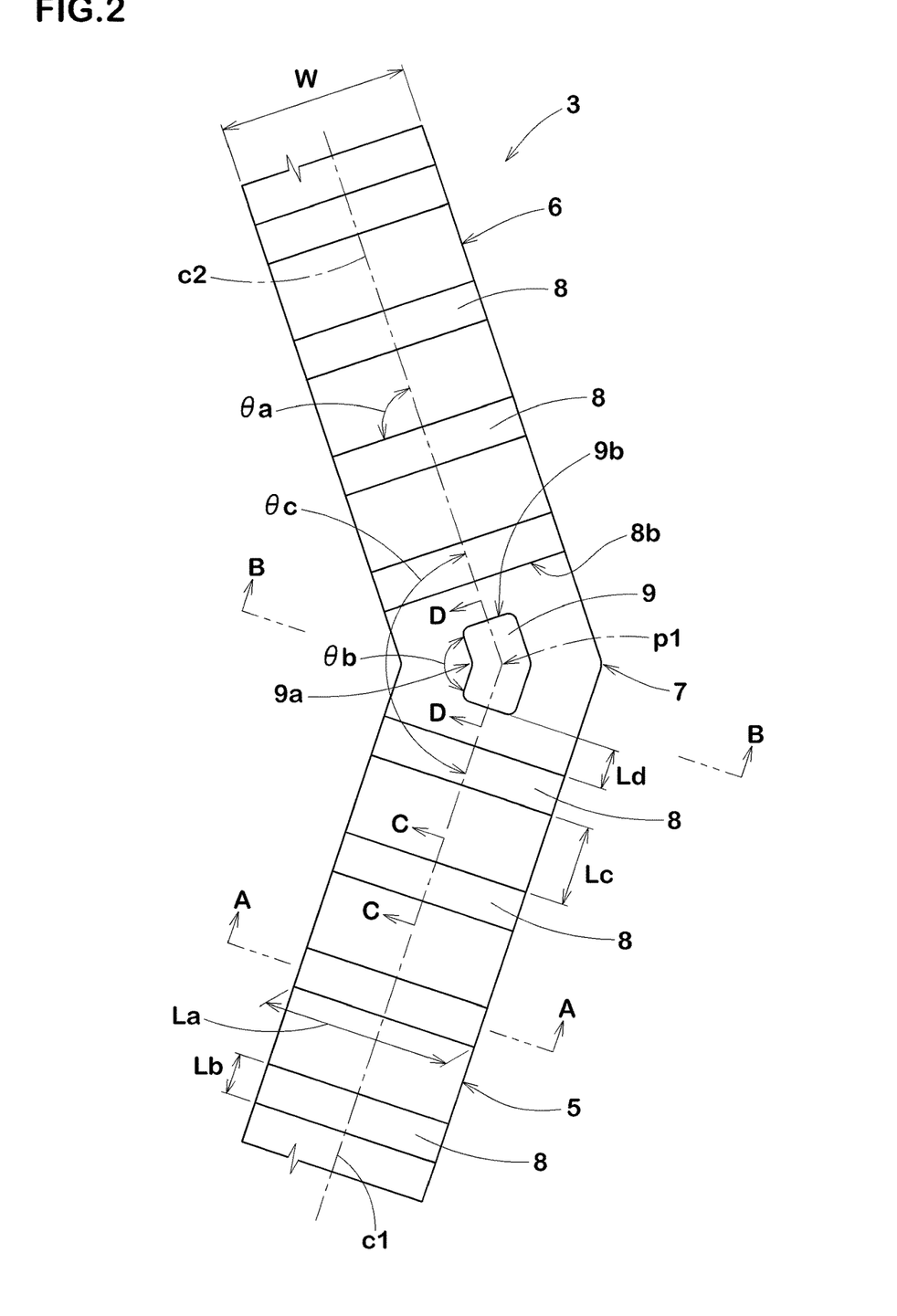
FIG. 2 is an enlarged view of a circumferential groove of FIG. 1.
Figure 3:
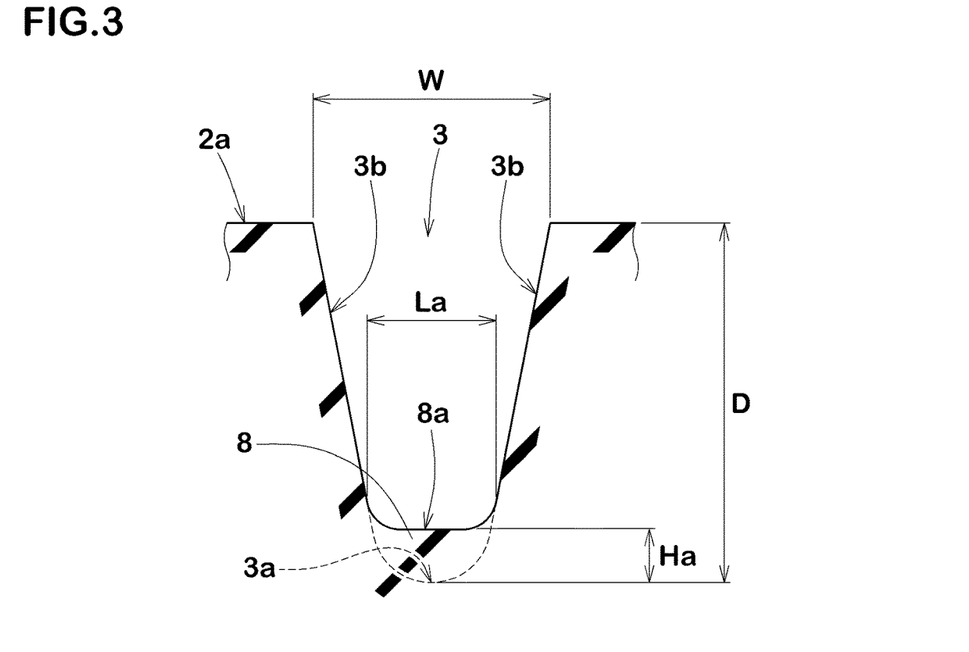
FIG. 3 is a cross-sectional view taken along the lines A-A of FIG. 2.

FIG. 2 is an enlarged view of one circumferential groove of FIG. 1, and FIG. 3 is a cross-sectional view taken along the lines A-A of FIG. 2. As illustrated in FIG. 1 to FIG. 3, each circumferential groove 3 according to the present embodiment includes a groove bottom 3*a* and a pair of groove walls 3*b* extending from the groove bottom 3*a* toward the ground contact surface 2*a*.

At least one of the circumferential grooves 3 (all the circumferential grooves 3 in the present embodiment) includes first inclined elements 5 inclined in a first direction with respect to the tire circumferential direction, and second inclined elements 6 inclined in a second direction opposite to the first direction with respect to the tire circumferential direction. Further, the at least one of the circumferential grooves 3 includes intersections 7 where the first inclined elements 5 and second inclined elements 6 intersect. In this embodiment, each intersection 7 includes a bending point p1 where the centerline c1 of the first inclined element 5 and the centerline s2 of the second inclined element 6 which are adjacent with each other intersect.

Each of the first inclined elements 5 and the second inclined elements 6 is provided with at least one first protrusion 8 (a plurality of first protrusions 8 in this embodiment). Each first protrusion 8 projects outwardly in the tire radial direction from the groove bottom 3*a* and connects the pair of groove walls 3*b*.

Figure 4:
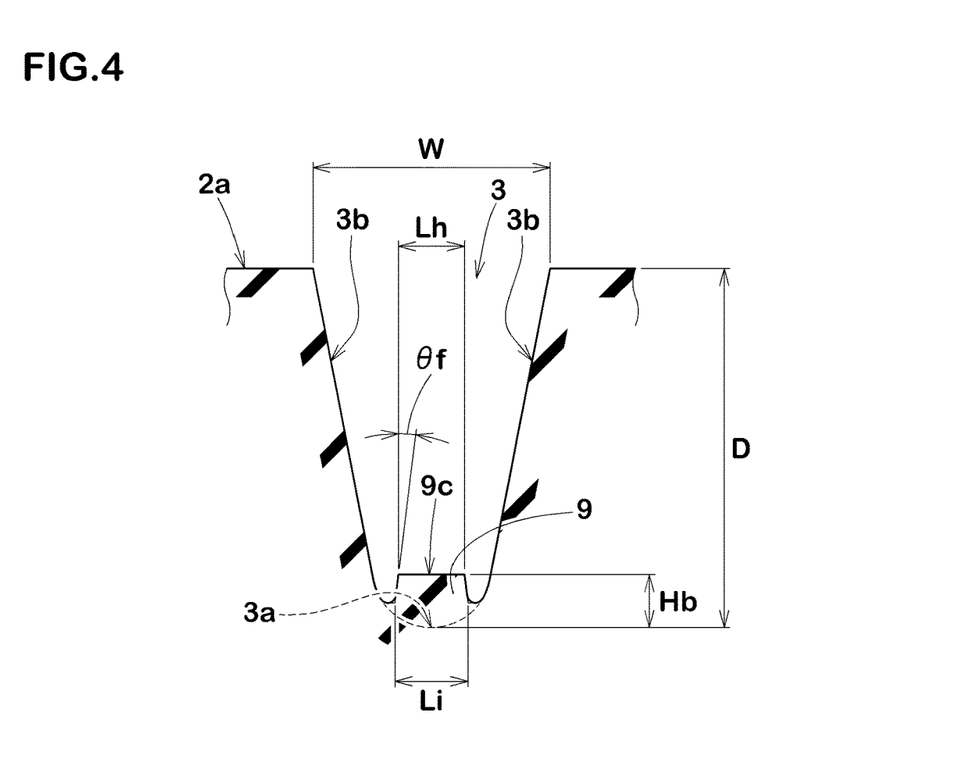
FIG. 4 is a cross-sectional view taken along the lines B-B of FIG. 2.

Such a first protrusion 8 can prevent a foreign matter such as a stone from biting into the first inclined elements 5 and the second inclined elements 6. In addition, since each first protrusion 8 connects the pair of the groove walls 3*b*, the rigidity around the circumferential groove 3 can be improved, and stone biting can be reliably suppressed even when cornering. FIG. 4 is a cross-sectional view taken along the lines B-B of FIG. 2. As illustrated in FIG. 2 and FIG. 4, at least one of the intersections 7 (all of intersections 7 in this embodiment) is provided with a second protrusion 9. In the present embodiment, each second protrusion 9 projects outwardly in the tire radial direction from the groove bottom 3a and is separated from the pair of groove walls 3b.

Such a second protrusion 9 can suppress stone biting even in the intersections 7 where it is difficult to provide the first protrusion 8 connecting a pair of the groove walls 3b. In addition, each second protrusion 9 allows the groove walls 3b to be deformed between when it is grounded and when it is not grounded. Thus, even if a foreign matter such as a stone gets caught when grounding, the foreign matter can be discharged when not grounding. Therefore, the tire 1 according to the present embodiment can improve stone biting resistance.

As illustrated in FIG. 1, in some more preferred embodiments, the circumferential grooves 3 include a crown circumferential groove 3A arranged on the tire equator C, and shoulder circumferential grooves 3B each arranged between the crown circumferential groove 3A and a respective one of tread edges Te. In the present embodiment, the crown circumferential groove 3A and the shoulder circumferential grooves 3B extend in a zigzag manner in the tire circumferential direction, and include the first inclined elements 5, the second inclined elements 6 and the intersections 7. Such a tire 1 can be suitable for driving on rough terrain.

As used herein, the tread edges Te are the axial outermost edges of the ground contacting patch of the tire 1 which occurs under the condition such that the tire 1 under a normal state is grounded on a plane with a standard tire load at zero camber angles. The tire equator C is the central position in the tire axial direction between the tread edges Te.

As used herein, the "normal state" is such that the tire 1 is mounted onto a standard wheel rim with a standard pressure but loaded with no tire load. Unless otherwise noted, dimensions of portions of the tire are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example. If there is no standard system including the standard on which tire 1 is based, the "standard wheel rim" is the rim specified by the manufacturer for the tire.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example. If there is no standard system including the standard on which tire 1 is based, the "standard pressure" is the air specified by the manufacturer for the tire.

As used herein, the "standard tire load" is a tire load officially approved for each tire by the standards organization in which the tire is based, wherein the standard tire load is the "maximum load capacity" in JATMA, the maximum value given in the above-mentioned table in TRA, and the "Load Capacity" in ETRTO, for example. If there is no standard system including the standard on which tire 1 is based, the "standard tire load" is the load specified by the manufacturer for the tire.

FIG. 1 illustrates an embodiment that the groove width of the crown circumferential groove 3A is substantially the same as the groove widths of the shoulder circumferential grooves 3B. However, the groove widths of the circumferential grooves 3 are not limited to such an embodiment. As to the groove widths of the circumferential grooves 3, for example, the groove width of the crown circumferential groove 3A may differ from those of the shoulder circumferential grooves 3B. Further, the groove widths of the pair of shoulder circumferential grooves 3B may differ from each other.

Here, the groove width of each circumferential groove 3 is the distance at the ground contact surface 2a between the pair of groove walls 3b in the direction orthogonal to the center line of the circumferential groove 3. Further, the groove width of each circumferential groove 3 is measured based on the pair of virtual groove walls 3b, which does not include recesses, slots, bends, etc. locally provided on the groove walls 3b.

The land portions 4, for example, include two crown land portions 4A each demarcated between the crown circumferential groove 3A and a respective one of the shoulder circumferential grooves 3B, and two shoulder land portions 4B demarcated between the shoulder circumferential grooves 3B and the tread edges Te.

For example, each crown land portion 4A is provided with a plurality of crown lateral grooves 10 connecting the intersections 7 of the crown circumferential groove 3A and the intersections 7 of the shoulder circumferential groove 3B. In the present embodiment, the crown lateral grooves 10 divide the crown land portion 4A into a plurality of crown blocks 11. Although not shown, the crown lateral grooves 10 may also be provided with one or more first protrusions 8, for example. The land portions 4 may be appropriately provided with other lateral grooves, narrow grooves, recesses, slots, sipes, etc. (not shown). Such a tire 1 can be suitable for running on rough terrain.

As illustrated in FIG. 1 and FIG. 2, in the present embodiment, the first protrusions 8 and the second protrusions 9 are spaced from one another. The circumferential grooves 3 can improve the stone bite resistance while maintaining the wet performance and rough road drivability of the tire 1 by ensuring the groove volume.

In a tread plan view, the first protrusions 8 each have a rectangular shape in which a length La in a groove-width direction is larger than a length Lb in a centerline direction of the circumferential groove 3. Such first protrusions 8 can connect the groove walls 3b while ensuring the groove volume, and can further improve rough road drivability of the tire 1.

Here, the length La in the groove-width direction of each first protrusion 8 and the length Lb in the centerline direction of the circumferential groove 3 are values measured from a projection plane of a radially outer first top surface 8a of the first protrusion 8 projected onto a plane.

Preferably, the length Lb in the centerline direction of the circumferential groove 3 of the first protrusions 8 is in a range from 10% to 50% of the minimum groove width W of the circumferential groove 3. When the length Lb in the centerline direction of the circumferential groove 3 of the first protrusions 8 is equal to or more than 10% of the minimum groove width W of the circumferential groove 3, the effect of suppressing stone biting can be surely achieved. When the length Lb in the centerline direction of the circumferential groove 3 of the first protrusions 8 is equal to or less than 50% of the minimum groove width W of the circumferential groove 3, the deformation of the first protrusions 8 can be promoted between grounding and not grounding, and a stone held in the groove can be discharged when not grounding. Here, the minimum groove width W of the circumferential groove 3 is the smallest groove width of the circumferential grooves 3.

In each first protrusion 8, an angle θa between an edge 8b connecting the pair of groove walls 3b and the centerline of the circumferential groove 3 is from 80 to 90 degrees. In such a first protrusion 8, it can be suppressed that the length La in the groove-width direction becomes excessively large. Thus, each first protrusion 8 can maintain an appropriate rigidity, suppressing the deformation during cornering so as to suppress stone biting during the cornering. From this point of view, the angle θa between the edge 8b and the center line of the circumferential groove 3 is more preferably 90 degrees.

Here, the edge 8b connecting the pair of groove walls 3b of each first protrusion 8 is the edge on the first top surface 8a. Further, the angle θa between the edge 8b and the centerline of the circumferential groove 3 means the acute angle or the right angle.

A distance Lc between directly adjacent first protrusions 8 is equal to or less than the minimum groove width W of the circumferential groove 3. Such an arrangement of the first protrusions 8 can suppress a foreign matter such as a stone from getting caught between the first protrusions 8 and can further improve stone biting resistance. In addition, the first protrusions 8 can suppress the foreign matter from coming into contact with the groove bottom 3a even if a foreign matter such as a stone is held between the groove walls 3b. Thus, it can be suppressed that the foreign matter penetrates the groove bottom 3a and damages the internal structure of tire 1 (e.g., so-called drilling). Here, the distance Lc between directly adjacent first protrusions 8 is the distance on the centerline of the circumferential groove 3 between the edges 8b of the first protrusions 8 which are directly adjacent to each other.

The distances Lc between the adjacent first protrusions 8 are preferably in a range from 20% to 100% of the minimum groove width W of the circumferential groove 3. By setting the distances Lc between the adjacent first protrusions 8 equal to or more than 20% of the minimum groove width W of the circumferential groove 3, a radius of curvature between the first protrusions 8 and the groove bottom 3a can be increased, and damage due to stress concentration thereto can be suppressed.

In the present embodiment, the second protrusions 9 are provided at positions including the respective bending points p1. Thus, the second protrusions 9 are provided at the center of the respective intersections 7. Such second protrusions 9 can effectively suppress stone biting and further improve stone biting resistance of the tire 1.

In a tread plan view, each second protrusion 9 according to the present embodiment has a concave polygonal shape that bends around the bending point p1. In a tread plan view, the concave polygonal shape may have a first portion extending in parallel with the first inclined element 5 from the bending point p1 and a second portion extending in parallel with the second inclined element 6 from the bending point p1. The first portion has an end located in the first inclined element 5, the second portion has an end located in the second inclined element 6, and the ends of the first and second portions are orthogonal to the centerline of the circumferential groove 3. Such a second protrusion 9 can maintain high rigidity without being connected to the groove walls 3b, and can suppress deformation when a foreign matter such as a stone is held.

The concave polygon shape has a concave corner 9a, and a concave angle θb of the concave corner 9a is preferably equal to or more than an angle θc between the centerlines c1 and c2 of the adjacent first inclined element 5 and the second inclined element 6, respectively, at the bending point p1. Such a second protrusion 9 can suppress the damage due to stress concentration by increasing the bending angle. Here, the concave angle □b of the concave corner 9a is an angle of the concave corner portion of the radial outer second top surface 9c of the second protrusion.

Preferably, a distance Ld between directly adjacent one of the second protrusions 9 and one of the first protrusions 8 is equal to or less than the minimum groove width W of the circumferential groove 3. Such a configuration can suppress a foreign matter such as a stone from getting caught between the first protrusion 8 and the second protrusion 9, and can further improve the stone biting resistance. In addition, such a configuration can suppress drilling even if a foreign matter such as a stone gets caught in the circumferential groove 3. Here, the distance Ld between directly adjacent one of the second protrusions 9 and one of the first protrusions 8 is the distance on the centerline of the circumferential groove 3 when the first top surface 8a and the second top surface 9c are projected onto a plane.

Preferably, the distance Ld between directly adjacent one of the second protrusions 9 and one of the first protrusions 8 is in a range from 10% to 85% of the minimum groove width W of the circumferential groove 3. When the distance Ld between directly adjacent one of the second protrusions 9 and one of the first protrusions 8 is greater than or equal to 10% of the minimum groove width W of the circumferential groove 3, the radius of curvature between the groove bottom 3a and the first protrusions 8 and the second protrusion 9 can be increased, and damage due to stress concentration can be suppressed. When the distance Ld between directly adjacent one of the second protrusions 9 and one of the first protrusions 8 is smaller than or equal to 85% of the minimum groove width W of the circumferential groove 3, it is useful for suppressing stone biting at the intersection 7 which have a complicated shape and are prone to stone biting.

Preferably, the distance Ld between directly adjacent one of the second protrusions 9 and one of the first protrusions 8 is smaller than the distance Lc between directly adjacent first protrusions 8. Such a configuration can suppress stone biting more reliably even if the intersection 7 has a complicated shape and are prone to stone biting.

Preferably, the distance Ld between directly adjacent one of the second protrusions 9 and one of the first protrusions 8 is in a range from 45% to 85% of the distance Lc between directly adjacent first protrusions 8. When the distance Ld is equal to or more than 45% of the distance Lc, the radius of curvature between the groove bottom 3a and the first protrusion 8 and the second protrusion 9 can be increased, and the damage due to stress concentration can be suppressed. When the distance Ld is equal to or less than 85% of the distance Lc, stone biting at the intersection 7 can be suppressed more reliably.

In a tread plan view, each second protrusion 9 according to the present embodiment includes one or more edges 9b that extend in parallel with the edges 3b, which connect the pair of groove walls 8b, of the first protrusions 8. In this case, the distance Ld between directly adjacent one of the second protrusions 9 and one of the first protrusions 8 is the distance between the edge 9b of the second protrusion 9 and the edge 8b of the first protrusion 8 which are adjacent to each other in a tread plan view. Such a configuration can equalize the distance Ld between the second protrusion 9 and the first protrusion 8, and can further improve stone biting resistance of the tire 1.

Figure 5:
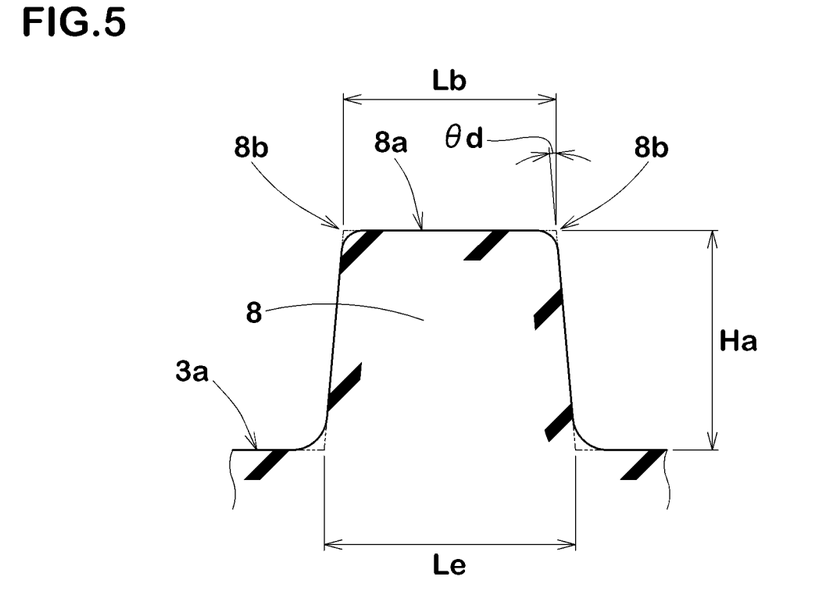
FIG. 5 is a cross-sectional view taken along the line C-C of FIG. 2.

FIG. 5 is a cross-sectional view taken along the lines C-C of FIG. 2. As illustrated in FIG. 3 and FIG. 5, a height Ha of the first protrusions 8 from the groove bottom 3a is preferably in a range from 10% to 50% of the maximum groove depth D of the circumferential groove 3. When the height Ha of the first protrusions 8 from the groove bottom 3a is equal to or more than 10% of the maximum groove depth D, biting of a foreign matter such as a stone can be suppressed. When the height Ha of the first protrusions 8 is equal to or less than 50% of the maximum groove depth D, the rigidity of the first protrusions 8 can be maintained and the deformation due to contact with a foreign matter such as a stone can be suppressed.

Here, the maximum groove depth D of the circumferential groove 3 is the maximum value of the groove depth of the circumferential groove 3 in which the first protrusion 8 is formed. Further, a groove depth of the circumferential groove 3 is the distance in the tire radial direction from the ground contact surface 2a to the deepest part of the groove bottom 3a.

As shown in FIG. 5, each first protrusion 8 has a length Le in a centerline direction of the circumferential groove 3 on the groove bottom 3a. Preferably, the length Le is greater than the length Lb of the first top surface 8a in the centerline direction of the circumferential groove 3. In such a first protrusion 8, when a foreign matter such as a stone is held between the adjacent first protrusions 8 when grounding, the foreign matter can be discharged due to the restoration of deformation of the first protrusions 8 when non-grounding, and stone biting resistance of the tire 1 can be improved.

Each first protrusion 8 has side surfaces extending toward the groove bottom 3a from the edges 8b of the first top surface 8a. Preferably, each side surface has an angle θd with respect to the tire radial direction in a range from 5 to 60 degrees. When the angle θd of each side surface extending from each edge 8b toward the groove bottom 3a is equal to or more than 5 degrees, it is possible to suppress a foreign matter such as a stone from getting caught in the vicinity of the groove bottom 3a and reliably suppress drilling. When the angle θd of each side surface extending from each edge 8b toward the groove bottom 3a is equal to or less than 60 degrees, the height Ha of each first protrusion 8 can be sufficiently secured, and biting of foreign matter can be surely suppressed. From this point of view, the angle θd of each side surface extending from each edge 8b toward the groove bottom 3a is more preferably in a range from 10 to 50 degrees.

Figure 6:
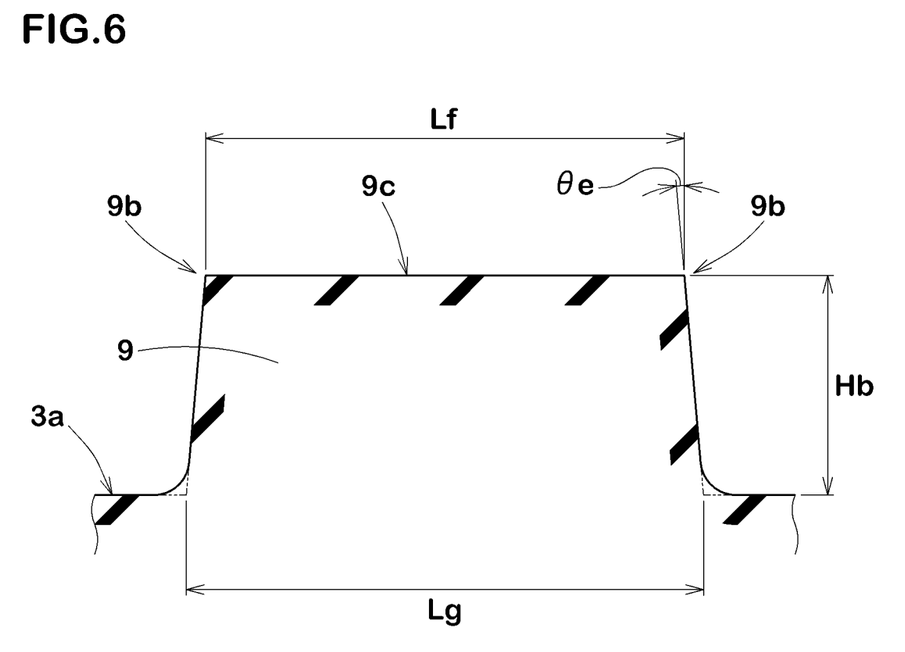
FIG. 6 is disclosure an end view taken along the line D-D of FIG. 2.

FIG. 6 is a cross-sectional view taken along the line D-D of FIG. 2. As illustrated in FIG. 4 and FIG. 6, a height Hb of the second protrusions 9 from the groove bottom 3a is preferably in a range from 10% to 60% of the maximum depth D of the circumferential groove 3. When the height Hb of the second protrusions 9 is equal to or more than 10% of the maximum depth D, it is possible to surely suppress the biting of a foreign matter such as a stone. When the height Hb of the second protrusions 9 is equal to or less than 60% of the maximum depth D, the rigidity of the second protrusions 9 can be maintained and the deformation due to contact with a foreign matter such as a stone can be suppressed.

As illustrated in FIG. 3 to FIG. 6, the height Hb of each second protrusion 9 is preferably in a range from 100% to 120% of the height Ha of each first protrusion 8. Such a first protrusion 8 and a second protrusion 9 can improve stone biting resistance of the tire 1 in a well-balanced manner.

A length Lf of the second protrusions 9 measured along the centerline direction of the circumferential groove 3 is preferably greater than the length Lb of the first protrusions 8 measured along the centerline direction of the circumferential groove 3. Such second protrusions 9 can have high rigidity and can further improve stone biting resistance of the tire 1. Here, the length Lf along the centerline of the circumferential groove 3 of each second protrusion 9 is the length when the second top surface 9c of each second protrusion 9 is projected onto a plane.

Each second protrusion 9 has a length Lg along the centerline of the circumferential groove 3 on of the groove bottom 3a. Preferably, the length Lg is greater than the length Lf of the second top surface 9c along the centerline of the circumferential groove 3. In such a second protrusion 9, when a foreign matter such as a stone is held between the adjacent first protrusion 8 and the second protrusion 9 when grounding, the foreign matter can be discharged due to restoration of the deformation of the second protrusion 9 when non-grounding, and stone biting resistance of the tire 1 can be improved.

Each second protrusion 9 has a pair of side surfaces extending from the edges 9b of the second top surface 9c toward the groove bottom 3a. Preferably, each side surface has an angle θe in a range from 5 to 60 degrees with respect to the tire radial direction. When each side surface extending from each edge 9b toward the groove bottom 3a has an angle equal to or more than 5 degrees, foreign matter such as a stone can be suppressed from getting caught near the groove bottom 3a, and drilling can surely be suppressed. When each side surface extending from each edge 9b toward the groove bottom 3a has an angle equal to or less than 60 degrees, a sufficient area of the second top surface 9c can be secured, and the biting of foreign substance such as a stone can surely be suppressed.

As shown in FIG. 4, the second top surface 9c of each second protrusion 9 has a length Lh in a direction orthogonal to the centerline of the circumferential groove 3. Preferably, the length Lh is equal to or less than 30% of the minimum groove width W of the circumferential groove 3. When the length Lh of the second top surface 9c in a direction orthogonal to the centerline of the circumferential groove 3 is equal to or less than 30% of the minimum groove width W of the circumferential groove 3, deformation between grounding and non-grounding of each second protrusion 9 may be promoted, and a foreign matter held when grounding can be discharged when non-grounding. Here, the length Lh of the second top surface 9c of each second protrusion 9 in a direction orthogonal to the centerline of the circumferential groove 3 is a length when the second top surface 9c of each second protrusion 9 is projected onto a plain.

Preferably, the length Lh of each second top surface 9c in a direction orthogonal to the centerline of the circumferential groove 3 is in a range from 50% to 100% of a length Li in a direction orthogonal to the centerline of the circumferential groove 3 on the groove bottom 3a side of the second protrusion 9. When a foreign matter such as a stone is held between one of the second protrusions 9 and one of the groove walls 3b when grounding, such a second protrusion 9 can discharge the foreign matter due to retorsion of deformation of the second protrusion 9 when non-grounding, improving stone biting resistance further.

In a cross-sectional view orthogonal to the centerline of the circumferential groove 3, each second protrusion 9 has a pair of side surfaces extending from the second top surface 9c toward the groove bottom 3a. Preferably, each side surface has an angle θf in a range from 5 to 22 degrees with respect to the tire radial direction. When the angle θf of each side surface is equal to or more than 5 degrees, a foreign matter such as a stone can be suppressed from getting caught near the groove bottom 3a, and drilling can surely be suppressed. When the angle θf of each side surface is equal to or less than 22 degrees, a sufficient area of each second top surface 9c can be secured, and the biting of a foreign substance such as a stone can be reliably suppressed.

Figure 7:
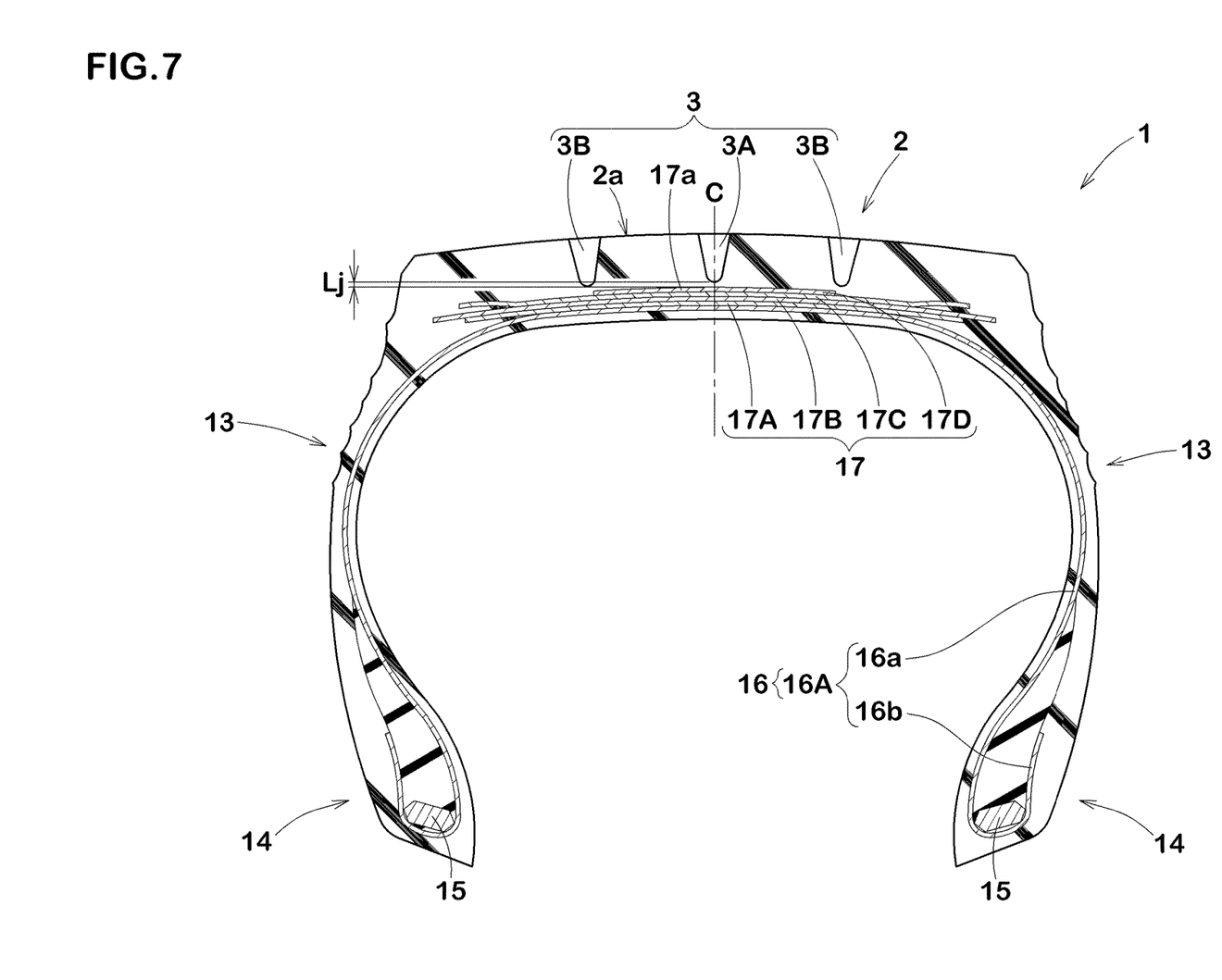
FIG. 7 is a tire meridian section of the tire.

FIG. 7 is a tire meridian section including the tire axis of the tire 1 under the normal state in accordance with the present embodiment. As illustrated in FIG. 7, the tire 1, for example, is suitably embodied as a heavy-duty tire for a truck or bus. The tire 1 is not specified as a heavy-duty tire, but can be embodied as various tires 1 such as passenger car tires, motorcycle tires, pneumatic tires such as competition tires, and non-pneumatic tires that are not filled with pressurized air, for example.

The tire 1 according to the present embodiment includes the annular tread portion 2, a pair of annular sidewall portions 13 on both sides of the tread portion 2, and a pair of annular bead portions 14 connected to the sidewall portions 13. The tire 1, for example, further includes a toroidal carcass 16 extending between bead cores 15 disposed in the bead portions 13, and a belt layer 17 disposed outwardly in the tire radial direction of the carcass 16 in the tread portion 2.

The carcass 16, for example, is composed of a single carcass ply 16A. The carcass ply 16A includes a plurality of carcass cords and a topping rubber covering the carcass cords. The carcass cords, for example, are oriented at an angle of from 75 to 90 degrees with respect to the tire circumferential direction. As the carcass cords, organic fiber cords such as nylon, polyester, rayon, etc. or steel cords may preferably be adopted, for example. The carcass 16, for example, may include two or more carcass plies 16A.

The carcass ply 16A, for example, includes a main portion 16a and a pair of turn-up portions 16b. The main portion 16a extends between the bead cores 15 of the bead portions 14 through the tread portion 2 and the pair of sidewall portions 13. Each turn-up portion 16b, for example, is connected to the main portion 16a and is turned up around a respective one of the bead cores 15 from axially inside to outside of the tire so as to extend outwardly in the tire radial direction. The carcass ply 16A may employ a so-called ultra-high turn-up structure in which the ends of the turn-up portions 16b extend between the main portion 16a and the belt layer 17.

The belt layer 17 includes at least one belt ply. In this embodiment, the belt layer 17 includes four belt plies 17A, 17B, 17C and 17D. Preferably, the belt layer 17 includes two or more bely plies 17A, 17B, 17C and 17D that are adjacent from one another in the tire radial direction. Such a belt layer 17 can help the belt plies 17A, 17B, 17C and 17D work together to improve the rigidity of the tread portion 2 and reduce rolling resistance of the tire 1.

Preferably, the belt plies 17A, 17B, 17C and 17D have the same configuration. Such belt plies 17A, 17B, 17C and 17D can be manufactured and managed as a common belt ply 17a, reducing the production cost. Alternatively, the belt plies 17A, 17B, 17C, and 17D may have different configurations, for example.

As illustrated in FIG. 1 to FIG. 7, it is preferable that a distance Lj in the tire radial direction from the groove bottom 3a of either one of the circumferential grooves 3 to the outermost surface of the belt layer 17 is greater than the sum (D−Ha+Lc) of a depth (D−Ha) from the ground contact surface 2a to the first top surface 8a and the distance Lc between directly adjacent first protrusions 8. In such a tread portion 2, when a foreign matter such as a stone is held between the adjacent first protrusions 8, there is no possibility that the foreign matter will reach the belt layer 17, and the occurrence of drilling can be surely suppressed. Here, the outermost surface of the belt layer 17 is the outermost surface of the belt ply 17D located on the outermost side in the tire radial direction.

Preferably, the distance $L_j$ in the tire radial direction from the groove bottom 3a of either one of the circumferential grooves 3 to the outermost surface of the belt layer 17 is greater than the sum (D−Hb+Ld) of a depth (D−Hb) from the ground contact surface 2a to either one of the second top surfaces 9c and the distance Ld between directly adjacent the second protrusion 9 and the first protrusion 8. In such tread portion 2, when a foreign matter such as a stone is held between the adjacent one of the second protrusions 9 and one of the first protrusions 8, there is no possibility that the foreign matter will reach the belt layer 17, and the occurrence of drilling can be surely suppressed.

In the above embodiment, an embodiment in which the second protrusions 9 each have a concave polygonal shape that bends around the bending point p1 is exemplified, but the shape of the second protrusions 9 is not limited to such an embodiment.

Figure 8:
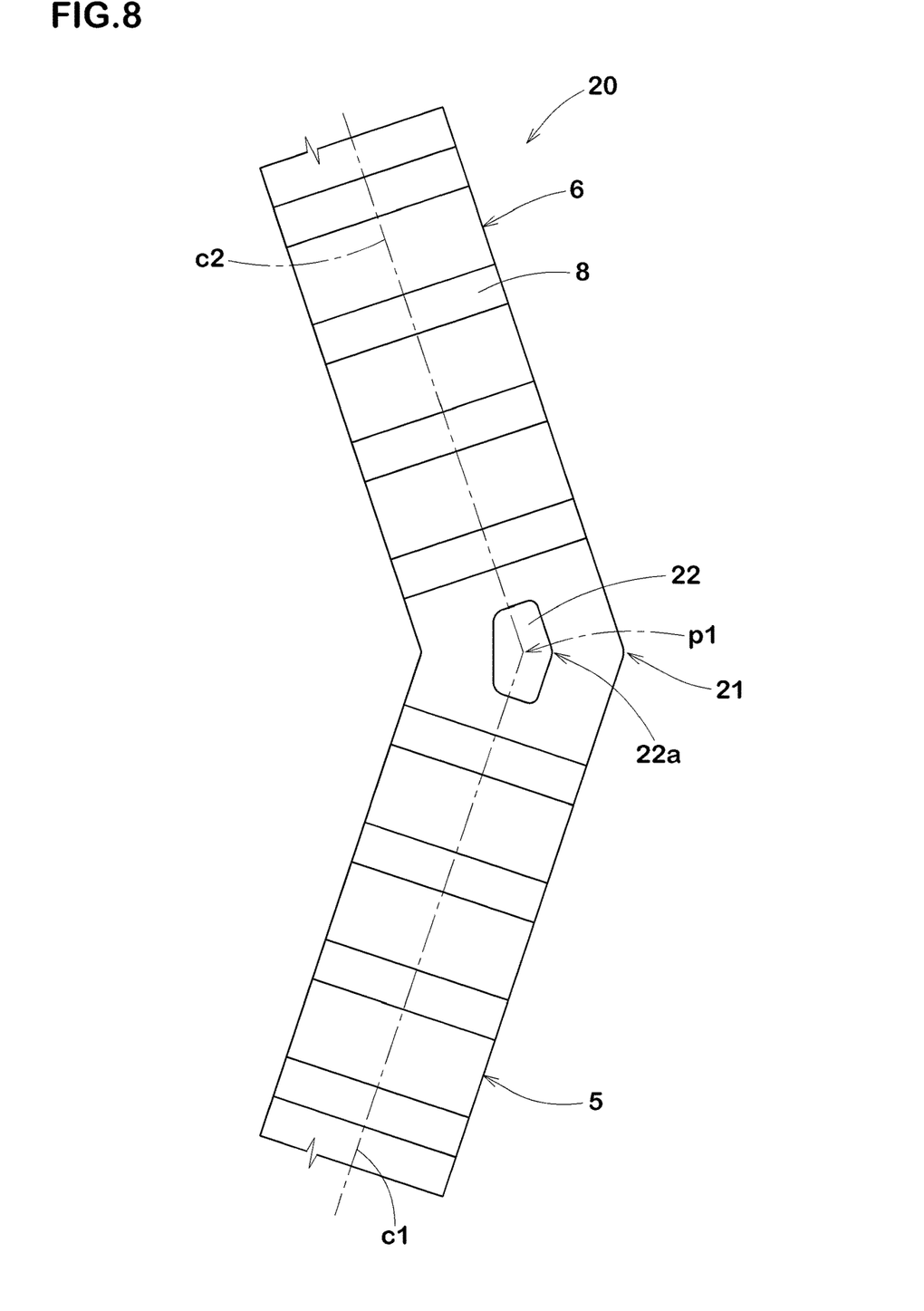
FIG. 8 is an enlarged view of the circumferential groove according to the second embodiment.

FIG. 8 is an enlarged view of one of the circumferential grooves 20 in accordance with the second embodiment. As illustrated in FIG. 8, the circumferential groove 20 according to the second embodiment has the same configuration as the circumferential grooves 3 described above, except for the shape of the second protrusions 22 provided at the intersections 21. The same configuration as the circumferential grooves 3 described above is denoted with the same reference number and its description is omitted.

In the second embodiment, one or more second protrusions 22 have a polygonal shape having one vertex 22a at the same tire circumferential position as the bending point p1 in a tread plan view. Such second protrusions 22 can maintain high rigidity even when an external force acts in a complicated direction centering on the bending point p1, and can improve stone biting resistance of the tire 1.

Figure 9:
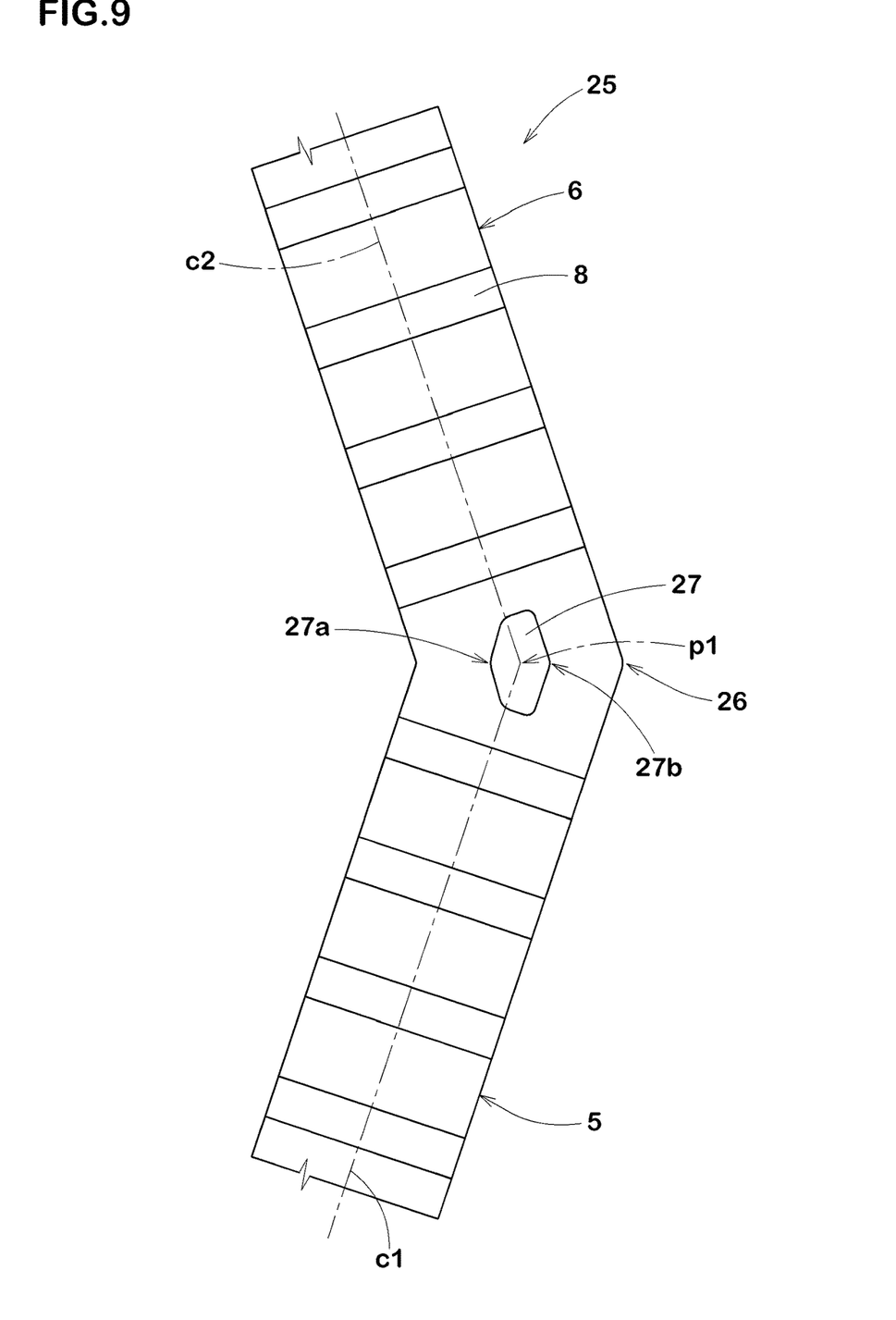
FIG. 9 is an enlarged view of the circumferential groove according to the third embodiment.

FIG. 9 is an enlarged view of one of the circumferential grooves 25 in accordance with the third embodiment. As illustrated in FIG. 9, the circumferential groove 25 according to the third embodiment has the same configuration as the circumferential grooves 3 described above, except for the shape of the second protrusions 27 provided at the intersections 26. The same configuration as the circumferential grooves 3 described above is denoted with the same reference number and its description is omitted.

One or more second protrusions 27 according to the third embodiment have a polygonal shape having two vertices 27a and 27b at the same tire circumferential position as the bending point p1 in a tread plan view. Such second protrusions 27 can maintain high rigidity even when an external force acts in a complicated direction centering on the bending point p1, and can improve stone biting resistance performance of the tire 1.

Although the particularly preferred embodiments of the present disclosure have been described in detail above, the present disclosure is not limited to the above-described embodiments, and may be modified into various embodiments.

EXAMPLE

Tires with the basic tread pattern shown in FIG. 1 were prepared based on the specifications in Table 1. The stone biting resistance was tested using these tires. The common specifications and the test method are as follows.
Common specifications:
  Tire size: 315/80R2 2.5
  Rim size: 9.00×22.5
  Test vehicle: Heavy truck
  Minimum groove width of circumferential grooves W: 14 mm
  Maximum depth of circumferential grooves D: 20.9 mm
  Distance from the bottom of the circumferential grooves to the belt layer Lj: 17.8 mm
Stone Biting Resistance Test:

The test tires are mounted on all wheels of the test vehicle with the standard internal pressure, and the test driver drove the vehicle for 100 km at a speed of 20 km/h on a test course of an unpaved gravel road surface with 20 turning points per 10 km. Then, the state of occurrence of stone biting was evaluated. The test results are indicated in Table 1 using an index with Ref. 1 as 100. The smaller the value, the smaller the number of stones bitten, indicating that the stone biting resistance is excellent.

Table 1 shows the test results.

TABLE 1

| First protrusions | Ref. 1 none | Ref. 2 FIG. 2 | Ref. 3 FIG. 2 | Ex. 1 FIG. 2 | Ex. 2 FIG. 2 | Ex. 3 FIG. 2 | Ex. 4 FIG. 2 | Ex. 5 FIG. 2 | Ex. 6 FIG. 2 |
|---|---|---|---|---|---|---|---|---|---|
| Angle θa between edges of first protrusions and centerline of circumferential groove (deg.) | — | 70 | 90 | 90 | 90 | 90 | 90 | 90 | 90 |
| Length Lb of first protrusions along centerline of circumferential groove (mm) | — | 3 | 3 | 3 | 3 | 3 | 3 | 3 | 3 |
| Length Le of first protrusions along centerline of circumferential groove on groove bottom side (mm) | — | 4 | 4 | 4 | 4 | 4 | 4 | 4 | 4 |
| Height Ha of first protrusions (mm) | — | 3.1 | 3.1 | 3.1 | 3.1 | 3.1 | 3.1 | 3.1 | 3.1 |
| Distance Lc between adjacent first protrusions (mm) | — | 6 | 6 | 6 | 6 | 6 | 6 | 6 | 6 |
| Second protrusions | none | none | none | FIG. 2 | FIG. 2 | FIG. 2 | FIG. 2 | FIG. 8 | FIG. 9 |
| Length Lf of second protrusions along the centerline of circumferential groove (mm) | — | — | — | 6.7 | 4.7 | 2.7 | 6.7 | 6.7 | 6.7 |
| Length Lg of second protrusions along the centerline of circumferential groove on groove bottom side (mm) | — | — | — | 8.1 | 6.1 | 4.1 | 8.1 | 8.1 | 8.1 |
| Length Lh of second protrusions orthogonal to centerline of circumferential groove (mm) | — | — | — | 4 | 4 | 4 | 4 | 4 | 4 |
| Length Li of second protrusions orthogonal to centerline of circumferential groove on groove bottom side (mm) | — | — | — | 5 | 5 | 5 | 5 | 5 | 5 |
| Height Hb of second protrusions (mm) | — | — | — | 3.1 | 3.1 | 3.1 | 2.1 | 3.1 | 3.1 |
| Distance Ld between adjacent second protrusions and first protrusions (mm) | — | — | — | 5 | 6 | 7 | 5 | 5 | 5 |
| Stone biting resistance (index) | 100 | 56 | 22 | 4 | 10 | 13 | 6 | 7 | 7 |

As a result of the test, it is confirmed that the tires of the examples have a smaller number of stones bitten than the comparative example, and the stone biting resistance is improved.

ADDITIONAL NOTE

This disclosure includes the following aspects.
[Note 1]
  A tire comprising:
  a tread portion having a ground contact surface,
  the tread portion being provided with a plurality of circumferential grooves extending continuously in a zigzag manner in a tire circumferential direction, each of the plurality of circumferential grooves comprising a groove bottom and a pair of groove walls extending from the groove bottom toward the ground contact surface,
  at least one of the plurality of circumferential grooves comprising first inclined elements inclined in a first direction with respect to the tire circumferential direction, second inclined elements inclined in a second direction opposite to the first direction with respect to the tire circumferential direction, and intersections where the first inclined elements and second inclined elements intersect, wherein
  each of the first inclined elements and the second inclined elements is provided with at least one first protrusion that projects outwardly in a tire radial direction from the groove bottom and connects the pair of groove walls, and
  at least one of the intersections is provided with a second protrusion that projects outwardly in the tire radial direction from the groove bottom and is separated from the pair of groove walls.
[Note 2]
  The tire according to note 1, wherein
  the at least one first protrusion and the second protrusion are separated from one another.
[Note 3]
  The tire according to note 1 or 2, wherein
  each intersection comprises a bending point where centerlines of the first inclined element and second inclined element intersect, and
  the second protrusion is provided at a position including the bending point.
[Note 4]
  The tire according to note 3, wherein
  in a tread plan view, the second protrusion has a polygonal shape having an apex at a same tire circumferential position as the bending point.
[Note 5]
  The tire according to note 3 or 4, wherein
  in a tread plan view, the second protrusion has a concave polygonal shape that bends around the bending point

[Note 6]
The tire according to note 5, wherein
the concave polygon shape has a concave corner, and
a concave angle θb of the concave corner is equal to or more than an angle θc between centerlines of the adjacent first inclined element and the second inclined element at the bending point.

[Note 7]
The tire according to any one of notes 1 to 6, wherein
in a tread plan view, the at least one first protrusion has a rectangular shape in which a length La in a groove-width direction is larger than a length Lb in a centerline direction of the at least one circumferential groove,
the rectangular shape has an edge connecting the pair of groove walls, and
an angle between the edge and a centerline of the at least one circumferential groove is of from 80 to 90 degrees.

[Note 8]
The tire according to note 7, wherein
in a tread plan view, the second protrusion has an edge parallel to the edge connecting the pair of groove walls of the at least one first protrusion.

[Note 9]
The tire according to any one of notes 1 to 8, wherein
the at least one first protrusion comprises a plurality of first protrusions,
each of the first inclined elements and the second inclined elements is provided with the plurality of first protrusions, and
a distance Lc between directly adjacent first protrusions and a distance Ld between directly adjacent the second protrusion and one of the first protrusions are equal to or less than a minimum groove width W of the at least one circumferential groove.

[Note 10]
The tire according to any one of notes 1 to 9, wherein
the at least one first protrusion comprises a plurality of first protrusions,
each of the first inclined elements and the second inclined elements is provided with the plurality of first protrusions, and
a distance Ld between directly adjacent the second protrusion and one of first protrusions is smaller than distances Lc between directly adjacent first protrusions.

[Note 11]
The tire according to any one of notes 1 to 10, wherein
a height Ha of the at least one first protrusion from the groove bottom and a height Hb of the second protrusion from the groove bottom is 10% to 50% of a maximum depth D of the at least one circumferential groove.

[Note 12]
The tire according to any one of notes 1 to 11, wherein
a length Lf of the second protrusion measured parallel to a centerline of the at least one circumferential groove is greater than a length Lb of the at least one first protrusion measured parallel to the centerline of the at least one circumferential groove.

The invention claimed is:

1. A tire comprising:
a tread portion having a ground contact surface,
the tread portion being provided with a plurality of circumferential grooves extending continuously in a zigzag manner in a tire circumferential direction, each of the plurality of circumferential grooves comprising a groove bottom and a pair of groove walls extending from the groove bottom toward the ground contact surface,
at least one of the plurality of circumferential grooves comprising first inclined elements inclined in a first direction with respect to the tire circumferential direction, second inclined elements inclined in a second direction opposite to the first direction with respect to the tire circumferential direction, and intersections where the first inclined elements and second inclined elements intersect, wherein
each of the first inclined elements and the second inclined elements is provided with at least one first protrusion that projects outwardly in a tire radial direction from the groove bottom and connects the pair of groove walls,
at least one of the intersections is provided with a second protrusion that projects outwardly in the tire radial direction from the groove bottom and is separated from the pair of groove walls, and
in a tread plan view,
the at least one first protrusion has a rectangular shape in which a length La in a groove-width direction is larger than a length Lb in a centerline direction of the at least one circumferential groove,
the rectangular shape has a first edge connecting the pair of groove walls,
an angle between the first edge and a centerline of the at least one circumferential groove is from 80 to 90 degrees, and
the second protrusion has a second edge parallel to the first edge of the at least one first protrusion.

2. The tire according to claim 1, wherein the at least one first protrusion and the second protrusion are separated from one another.

3. The tire according to claim 1, wherein
each intersection comprises a bending point where centerlines of the first inclined element and second inclined element intersect, and
the second protrusion is provided at a position including the bending point.

4. The tire according to claim 3, wherein in a tread plan view, the second protrusion has a polygonal shape having an apex at a same tire circumferential position as the bending point.

5. The tire according to claim 3, wherein in a tread plan view, the second protrusion has a concave polygonal shape that bends around the bending point.

6. The tire according to claim 5, wherein
the concave polygon shape has a concave corner, and
a concave angle qb of the concave corner is equal to or more than an angle qc between centerlines of the adjacent first inclined element and the second inclined element at the bending point.

7. The tire according to claim 1, wherein
the at least one first protrusion comprises a plurality of first protrusions,
each of the first inclined elements and the second inclined elements is provided with the plurality of first protrusions, and
a distance Lc between directly adjacent first protrusions and a distance Ld between directly adjacent the second protrusion and one of the first protrusions are equal to or less than a minimum groove width W of the at least one circumferential groove.

8. The tire according to claim 1, wherein
the at least one first protrusion comprises a plurality of first protrusions, each of the first inclined elements and the second inclined elements is provided with the plurality of first protrusions, and a distance Ld between directly adjacent the second protrusion and one of first protrusions is smaller than distances Lc between directly adjacent first protrusions.

9. The tire according to claim 1, wherein a height Ha of the at least one first protrusion from the groove bottom and a height Hb of the second protrusion from the groove bottom is 10% to 50% of a maximum depth D of the at least one circumferential groove.

10. The tire according to claim 1, wherein a length Lf of the second protrusion measured parallel to a centerline of the at least one circumferential groove is greater than a length Lb of the at least one first protrusion measured parallel to the centerline of the at least one circumferential groove.

11. The tire according to claim 5, wherein in a tread plan view, the concave polygonal shape has a first portion extending in parallel with the first inclined element from the bending point and a second portion extending in parallel with the second inclined element from the bending point.

12. The tire according to claim 11, wherein in a tread plan view, the first portion has an end located in one of the first inclined elements, the second portion has an end located in one of the second inclined elements, and the end of the first portion and the end of the second portion are orthogonal to centerline of the circumferential groove.

13. The tire according to claim 1, further comprising a pair of annular sidewall portions on both sides of the tread portion, and a pair of annular bead portions connected to the sidewall portions, a toroidal carcass extending between the pair of bead portions and a belt layer disposed outwardly in the tire radial direction of the carcass, wherein the at least one first protrusion comprises a plurality of first protrusions, and a distance (Lj) in the tire radial direction from the groove bottom of the at least one of the plurality of circumferential grooves to an outermost surface of the belt layer is greater than a sum (D−Ha+Lc) of a depth (D−Ha) from the ground contact surface to one of the first protrusions and a distance Lc between directly adjacent first protrusions.

14. The tire according to claim 13, wherein the distance (Lj) is greater than a sum (D−Hb+Ld) of a depth (D−Hb) from the ground contact surface to the second protrusion and a distance Ld between directly adjacent the second protrusion and one of the first protrusions.

15. The tire according to claim 1, wherein the second protrusion has a second edge parallel to the first edge of the at least one first protrusion such that a distance Ld between the first edge and the second edge is constant over an entire length of the second edge.

16. The tire according to claim 1, wherein all the intersections are provided with a second protrusion that projects outwardly in the tire radial direction from the groove bottom and is separated from the pair of groove walls.

17. The tire according to claim 1, wherein the tread portion is provided with at least two circumferential grooves extending continuously in a zigzag manner in a tire circumferential direction, each circumferential groove comprising first inclined elements inclined in a first direction with respect to the tire circumferential direction, second inclined elements inclined in a second direction opposite to the first direction with respect to the tire circumferential direction, and intersections where the first inclined elements and second inclined elements intersect, each of the circumferential grooves comprises a groove bottom and a pair of groove walls extending from the groove bottom toward the ground contact surface, a plurality of lateral grooves connects some of the intersections of one of the at least two circumferential grooves with some of the intersections of the other one of the at least two circumferential grooves to form a plurality of blocks having a hexagonal ground contact surface, each of the blocks having a pair of corners protruding outwardly in a block-width direction at respective intersections of the at least two circumferential grooves where the lateral grooves are not connected, the intersections where the lateral grooves are not connected are provided with a second protrusion that projects outwardly in the tire radial direction from the groove bottom and is separated from the pair of groove walls, and each second protrusion is bent to protrude outwardly in the block-width direction along the respective corner of each block.

* * * * *